(12) United States Patent
Chari et al.

(10) Patent No.: US 7,761,794 B1
(45) Date of Patent: Jul. 20, 2010

(54) INTEGRATED AUDIT AND CONFIGURATION TECHNIQUES

(75) Inventors: Srikumar Chari, Cupertino, CA (US); Jason Yansheng Jiang, Fremont, CA (US); Premchandar Namasivayam, Tamil Nadu (IN); Swapnil Pathrikar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 732 days.

(21) Appl. No.: 10/764,323

(22) Filed: Jan. 22, 2004

(51) Int. Cl.
*G06F 3/00* (2006.01)
*G06F 15/173* (2006.01)

(52) U.S. Cl. .................. 715/700; 709/223
(58) Field of Classification Search .......... 715/961, 715/962; 709/223
See application file for complete search history.

(56) References Cited

U.S. PATENT DOCUMENTS

| | | | |
|---|---|---|---|
| 4,589,063 A | 5/1986 | Shah et al. | |
| 4,864,492 A * | 9/1989 | Blakely-Fogel et al. | 706/45 |
| 5,220,654 A * | 6/1993 | Benson et al. | 710/8 |
| 5,257,387 A | 10/1993 | Richek et al. | |
| 5,261,042 A | 11/1993 | Brandt | |
| 5,265,241 A | 11/1993 | Arnold et al. | |
| 5,353,432 A | 10/1994 | Richek et al. | |
| 5,394,522 A | 2/1995 | Sanchez-Frank et al. | |
| 5,428,791 A | 6/1995 | Andrew et al. | |
| 5,452,415 A | 9/1995 | Hotka | |
| 5,500,934 A | 3/1996 | Austin et al. | |
| 5,515,524 A | 5/1996 | Lynch et al. | |
| 5,517,646 A | 5/1996 | Piccirillo et al. | |
| 5,740,436 A | 4/1998 | Davis et al. | |
| 5,787,246 A | 7/1998 | Lichtman et al. | |
| 5,819,028 A * | 10/1998 | Manghirmalani et al. | 714/57 |
| 5,819,042 A | 10/1998 | Hansen | |
| 5,825,361 A | 10/1998 | Rubin et al. | |
| 5,838,907 A | 11/1998 | Hansen | |
| 5,974,254 A * | 10/1999 | Hsu | 717/109 |
| 6,049,671 A * | 4/2000 | Slivka et al. | 717/173 |
| 6,085,206 A * | 7/2000 | Domini et al. | 715/257 |
| 6,098,098 A * | 8/2000 | Sandahl et al. | 709/221 |
| 6,119,185 A | 9/2000 | Westerinen et al. | |
| 6,134,614 A * | 10/2000 | Chari et al. | 710/302 |
| 6,151,567 A * | 11/2000 | Ames et al. | 703/13 |

(Continued)

OTHER PUBLICATIONS

Kyon Holman Dell OpenManage Using Network Manager to Deply Firmware and Backup/Restore Configuration Files Dell Power Connect Nov. 17, 2003.*

(Continued)

*Primary Examiner*—William L Bashore
*Assistant Examiner*—Andrea N Long
(74) *Attorney, Agent, or Firm*—Hickman Palermo Truong & Becker LLP

(57) ABSTRACT

Techniques for integrated audit and configuration are provided. The techniques include receiving a request from a user to analyze first configuration information with a second set of configuration information; receiving the first configuration information; analyzing one or more parameters of the first configuration information with the second set of configuration information to result in creating and storing comparison information; displaying the comparison information; choosing one or more action mechanisms to provide to the user for each of the one or more parameters based on the comparison information; and enabling the user to perform one or more actions associated with the one or more action mechanisms.

22 Claims, 9 Drawing Sheets

U.S. PATENT DOCUMENTS

| | | | |
|---|---|---|---|
| 6,236,993 | B1* | 5/2001 | Fanberg .................. 707/6 |
| 6,263,382 | B1 | 7/2001 | Bartlett et al. |
| 6,266,675 | B1 | 7/2001 | Evans et al. |
| 6,343,360 | B1 | 1/2002 | Feinleib |
| 6,349,274 | B1 | 2/2002 | Kay et al. |
| 6,405,309 | B1 | 6/2002 | Cheng et al. |
| 6,513,045 | B1 | 1/2003 | Casey et al. |
| 6,578,142 | B1 | 6/2003 | Anderson et al. |
| 6,650,648 | B1 | 11/2003 | Du |
| 6,880,107 | B1* | 4/2005 | Kraft, IV .................. 714/36 |
| 7,024,660 | B2* | 4/2006 | Andrade et al. ............ 717/124 |
| 7,051,243 | B2* | 5/2006 | Helgren et al. ............. 714/48 |
| 2001/0029529 | A1* | 10/2001 | Tachibana et al. .......... 709/220 |
| 2002/0112095 | A1* | 8/2002 | Ford et al. ................. 709/330 |
| 2002/0131067 | A1* | 9/2002 | Cox ........................ 358/1.14 |
| 2002/0188667 | A1* | 12/2002 | Kirnos ...................... 709/203 |
| 2003/0149756 | A1* | 8/2003 | Grieve et al. ............... 709/223 |
| 2003/0163496 | A1* | 8/2003 | Terazono et al. ........... 707/204 |
| 2004/0049566 | A1* | 3/2004 | Mattila et al. .............. 709/223 |
| 2005/0102676 | A1* | 5/2005 | Forrester ................... 718/105 |
| 2006/0156294 | A1* | 7/2006 | Fuller et al. ................ 717/154 |

OTHER PUBLICATIONS

Chris Hardie Computer Security Audit Checklist Copyright 1995-2003.* www.sun.com Security Auditing 1994-2002 Sun Microsystems, Inc.*

Configuration File Compare Window Updated Mar. 15, 2003.*

* cited by examiner

FIG. 2b

| Aspect Determination Page 202 | |
|---|---|
| Aspect Description Column 211<br><br>Aspect 1<br><br>Aspect 2<br><br>Aspect 3 | Choice Column 221<br><br>[ ]  [ ]<br><br>[ ]  [ ]<br><br>[ ]  [ ] |

Navigation Row 276

| Back 271 | Next 272 | Finish 273 | Cancel 274 | Help 275 |

FIG. 2c

```
Progress Page 203
┌─────────────────────────────────┐  ┌──────────────────┐
│ Description Column 210          │  │ Result Column 223│
│                                 │  │                  │
│   Service ABC is enabled        │  │   Passed         │
│                                 │  │                  │
│   Banner not set                │  │   Not Passed     │
│                                 │  │                  │
│   Set user account              │  │   Passed         │
│                                 │  │                  │
└─────────────────────────────────┘  └──────────────────┘
                        [ Close 277 ]
```

INTEGRATED AUDIT AND CONFIGURATION TECHNIQUES

FIELD OF THE INVENTION

The present invention relates to configuration and security issues relating to devices on a network. The present invention specifically relates to integrated audit and configuration techniques.

BACKGROUND OF THE INVENTION

Many computing devices are difficult to configure. For example, the configuration of integrated network security systems is complex. To configure these devices, one must understand the configuration and interrelation of network elements that enforce security policies, such as routers, switches, firewalls, virtual private networks (VPN), and Intrusion Detection Systems (IDS).

One approach to configuring these complex systems is to manually configure each device using command-line interface (CLI) commands that are entered using a terminal interface or packaged in a configuration file on each device. In this approach, multiple configuration parameter values are needed to fully specify the configuration for the device. The configuration parameter values are specified using key-value pairs. The problem with this approach is that much expertise is needed by the party configuring the device, e.g. knowing the appropriate keys and values are for the desired configuration. Another problem with this approach is that it is difficult to compare the configuration of a device to another configuration or to analyze the configuration with respect to a set of best-practice configuration rules. A third problem with the approach is that it does not give an overview summary of the entire security configuration. Still another problem is that the correct configuration must be applied to multiple devices that cooperate to enforce security.

A second approach to configuring complex devices is to use a network management system having a graphical user interface (GUI). For a given feature, the user will go to a fixed location on the interface to configure each aspect of the device. One problem with this approach is that the operator configuring the device needs expertise to know where to navigate. Another problem with this approach is that it is difficult to compare the configuration to another configuration or to analyze the configuration with respect to a set of best-practice configuration rules. Still another problem is that the correct configuration must be applied to multiple devices that cooperate to enforce security. The approach also does not give an overview or summary of the entire security configuration.

A third approach to configuring complex devices is to use a wizard. In using a wizard, an operator is provided a series of steps for configuring the device. The approach overcomes the need for a priori knowledge of key-value configuration parameters and knowledge of parameter specification locations in a GUI. A problem with the approach is that the number of steps in the wizard is proportional to the number of parameters that need to be configured. In a complex system with many parameters, therefore, the number of steps in the wizard will be many and, therefore, using the wizard will be inefficient. Another problem with this approach is that it is difficult to compare the configuration to another configuration or to analyze the configuration with respect to a set of best-practice configuration rules. The approach also does not give an overview summary of the entire security configuration.

A fourth approach to configuring complex devices is using an assessment tool, such as a Router Assessment Tool (RAT). A RAT tool is typically implemented with a web server to which an operator uploads a configuration file via a web page. The RAT tool then returns a web page containing a comparison of the uploaded configuration file to second configuration file stored on the RAT tool. A problem with the approach is that the page returned from the RAT tool needs to be interpreted by a human operator and implemented as changes in the local configuration file. In some instances, the output of the RAT tool includes human-readable warnings about certain parameters, in which case operator expertise is needed to understand and correct the parameters in the configuration file associated with the warning. For example, if the output reads "Password not set", the operator must be able to find in the file where to set the password and know the proper syntax to set the password. In other cases, where the RAT tool outputs a suggested line to add to the configuration file, the operator must cut and paste the suggested line into the configuration file. The manual cut and paste step is time consuming and can lead to operator error. Another problem with the approach is that it does not give an overview summary of the entire security configuration.

Therefore, it is clearly desirable to have techniques for configuring a device that overcome the problems of needing expertise in the process of configuring the device; not being able to analyze the configuration with respect to sets of configuration information; not being able to view an overview of the configuration; not needing to cut and paste configuration information; and not requiring the expertise needed to interpret human-readable instructions on how to modify the configuration manually. Furthermore, it is clearly desirable to have the techniques for configuring security devices, since these devices are especially complicated and any error in configuration could have serious consequences including opening security vulnerabilities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

Techniques are provided for integrated audit and configuration that include the steps of receiving a request from a user to analyze first configuration information with a second set of configuration information; receiving the first configuration information; analyzing one or more parameters of the first configuration information with the second set of configuration information to result in creating and storing comparison information; displaying the comparison information; choosing one or more action mechanisms to provide to the user for each of the one or more parameters based on the comparison information; and enabling the user to perform one or more actions associated with the one or more action mechanisms.

In a related feature, the second set of configuration information includes a set of one or more parameter values; and the step of analyzing one or more parameters of the first confirmation information includes comparing the values of the one or more parameters in the first configuration information with corresponding parameter values from the set of one or more parameter values from the second set of configuration information. In a related feature, the second set of configuration information includes a set of one or more rules; and the step of analyzing one or more parameters of the first confirmation information includes analyzing the one or more parameters of the first configuration information with respect to the set of one or more rules.

In a related feature, the one or more actions comprise one or more of toggle actions, fix actions, user input actions, wizard actions, and lockdown actions; and the one or more action mechanisms comprise one or more of toggle action mechanisms, fix action mechanisms, user input action mechanisms, wizard action mechanisms, and lockdown action mechanisms. In a related feature, the techniques further comprise receiving a second request from the user to perform one action of the one or more actions and performing the one action.

In a related feature, the second request is one of one or more requests to perform actions, and where the method further includes the step of performing the one or more corresponding actions based on the one or more requests to perform actions, where performing the one or more corresponding actions includes constructing new configuration information based on the first configuration information and each action.

In a related feature, the techniques further includes checking the new configuration against an object model of acceptable configurations and, if the changes are not acceptable, displaying a summary of problems. In a related feature, the new configuration is the configuration for a configurable system, the configurable system includes one or more configurable devices; and the techniques further includes receiving a third request to submit the changes; checking the new configuration information against an object model of acceptable configurations; and if the changes are acceptable, configuring the configurable system.

In a related feature, the first configuration information includes the configuration for a configurable system; the configurable system includes one or more configurable devices; and the first configuration information is for each of the one or more configurable devices; and where the step of receiving the first configuration information includes obtaining the first configuration information for each of the one or more configurable devices.

In a related feature, the second set of configuration information is one of one or more sets of second configuration information; and the techniques further include the step of selecting the second set of configuration information based on the request from the user. In a related feature, the second set of configuration information is one or one or more sets of second configuration information; and where the techniques further include the step of selecting the second set of configuration information based on one or more industry standard configurations for the device to be configured.

In a related feature, the one or more actions comprise one or more toggle actions, and the one or more action mechanisms comprise one or more toggle action mechanisms, and where the step of performing the action associated with a particular toggle action mechanism includes changing a parameter value associated with the particular toggle action mechanism. In a related feature, the one or more actions comprise one or more fix actions, and the one or more action mechanisms comprise one or more fix action mechanisms, and where the step of performing the action associated with the fix action mechanism includes changing a parameter value associated with a particular fix action mechanism based on a corresponding parameter value in the second set of configuration information.

In a related feature, the one or more actions comprise one or more user input actions, and the one or more action mechanisms comprise one or more user input action mechanisms, and the step of performing the action associated with a particular user input action mechanism includes obtaining user input for a parameter value associated with the particular user input action mechanism; and changing the parameter value associated with the particular user input action mechanism based on the user input. In a related feature, the one or more actions comprise one or more wizard actions, and the one or more action mechanisms comprise one or more wizard action mechanisms, and where the step of performing the action associated with a particular wizard action mechanism includes the step of running a wizard associated with the particular wizard action mechanism.

In another aspect, techniques are provided for integrated audit and configuration including the steps of receiving a request from a user to analyze first configuration information with a second set of configuration information; obtaining the first configuration information; receiving the first configuration information; analyzing one or more parameters of the first configuration information with the second set of configuration information to result in creating and storing comparison information, where the second set of configuration information includes a set of one or more rules; and where the step of analyzing one or more parameters of the first confirmation information includes analyzing the one or more parameters of the first configuration information with respect to the set of one or more rules; displaying the comparison information; choosing one or more action mechanisms to provide to the user for each of the one or more parameters based on the comparison information; enabling the user to perform one or more actions associated with the one or more action mechanisms; receiving a second request from the user to perform one action of the one or more actions; and performing the one action, where performing the action includes constructing new configuration information based on the first configuration information and the one action.

In another aspect, techniques are provided for integrated security audit and security configuration including the steps of receiving a request from a user to analyze first security configuration information with a second set of security configuration information; receiving the first security configuration information; analyzing one or more parameters of the first security configuration information with the second set of security configuration information to result in creating and storing comparison information, where the second set of security configuration information includes a set of one or more rules; and where the step of analyzing one or more parameters of the first confirmation information includes analyzing the one or more parameters of the first security configuration information with respect to the set of one or more rules; displaying the comparison information; choosing one or more action mechanisms to provide to the user for each of the one or more parameters based on the comparison information; enabling the user to perform one or more actions associated with the one or more action mechanisms; receiving a second request from the user to perform one action of the one or more actions; and performing the one action, where performing the action includes constructing new security configuration information based on the first security configuration information and the one action.

In another aspect, a machine-readable medium is provided for carrying one or more sequences of instructions for integrated audit and configuration, which instructions, when executed by one or more processors, cause the one or more processors to carry out the techniques described herein. In another aspect, an apparatus is provided for a network interface that is coupled to a data network for receiving one or more packet flows therefrom; a processor; one or more stored sequences of instructions which, when executed by the processor, cause the processor to carry out the techniques described herein. In another aspect, an apparatus is provided for means for the techniques described herein.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2*b* is an illustration depicting an aspect determination page.

FIG. 2*c* is an illustration of a progress page.

DETAILED DESCRIPTION OF THE INVENTION

Integrated audit and configuration techniques are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

System Overview

Figure 1:
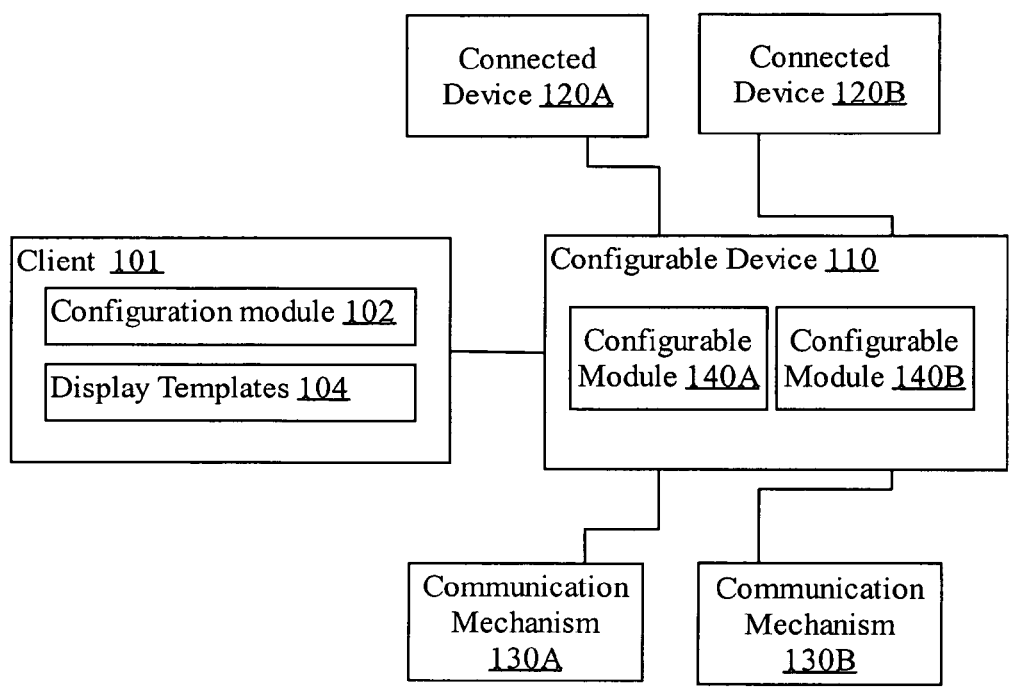
FIG. 1 is a block diagram that illustrates an example system for integrated audit and configuration.

FIG. 1 is a block diagram that illustrates an example system for integrated audit and configuration.

One or more clients 101 are communicatively coupled to a configurable device 110. The configurable device 110 is communicatively coupled to one or more connected devices 120A, 120B. The configurable device 110 is also communicatively coupled to one or more communication mechanisms 130A, 130B. In various embodiments, communicatively coupling is performed by a network such as a wireless network, dial up access, the Internet, a local area network (LAN), or any other communication network. In various embodiments, communicatively coupling is performed by a direct connection such as a cable, infrared connection or other carrier medium.

In various embodiments, client 101 is a web browser or an application running on a computer. In various embodiments, the client 101 runs on one or more dedicated devices such as embedded systems or computers. In one embodiment, the client 101 runs on a different machine than the configurable device 110. In another embodiment, the client 101 runs on the configurable device 110. In various embodiments, the configurable device 110 is a router, hub, switch, mail server, database, or any other configurable device or application on a computer or other machine.

Figure 5:
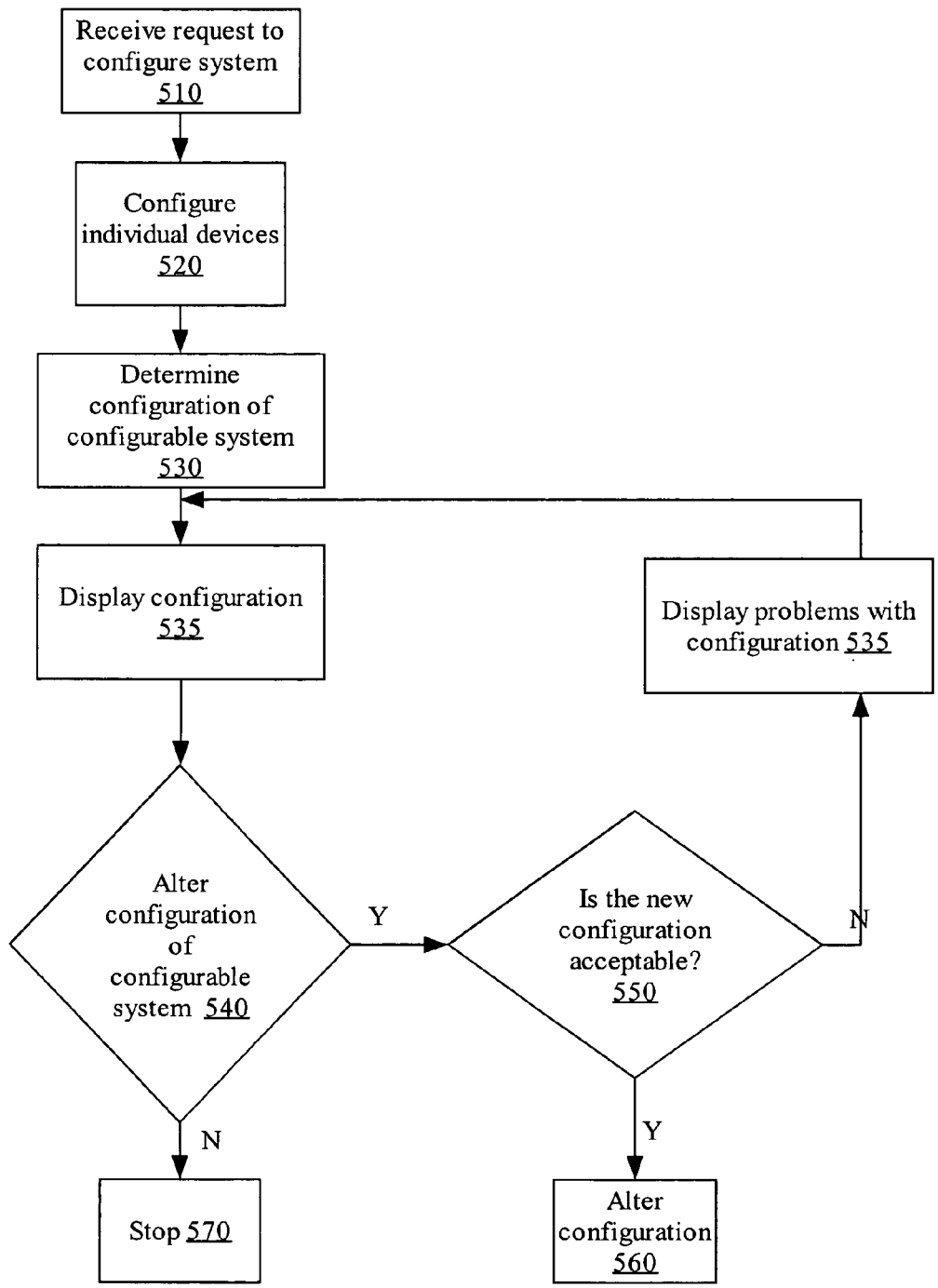
FIG. 5 is a flow diagram of a technique for configuring a configurable system.

Client 101 comprises a configuration module 102 and display templates 104. In various embodiments, the configuration module is one or more software elements, a subroutine within the client, or a separate application communicatively coupled to the client. In various embodiments, the display templates 104 are software elements that define a manner of displaying audit and configuration information or are templates in a formatting language such as HTML or XML. In various embodiments, the processes for integrated audit and configuration described in FIGS. 3 and 5 are implemented in the configuration module 102. In various embodiments, the pages described with respect to FIG. 2 are based on the display templates 104.

In various embodiments, the connected devices 120A, 120B are firewalls, IDSs, or any other device to which the configurable device 110 is connected. In various embodiments, the connected devices 120A, 120B are applications running on embedded system, computers or other machines. In various embodiments, the communication mechanism 130A, 130B are modems, routers, hubs, switches, interfaces to a network, or any other appropriate communication mechanisms. In various embodiments, the configurable device 110 comprise configurable modules 140A, 140B. In various embodiments, the configurable modules 140A, 140B are firewalls, IDSs, or any other configurable module accessible to the configurable device 110. In various embodiments, the configurable modules 140A, 140B are applications running on configurable device 110 or on a machine thereto communicatively coupled.

Interface Elements

FIG. 2*a*, 2*b*, 2*c*, 2*d* are illustrations of sample interface pages. In general, the organization and exact composition of interface pages 200, 201, 202, and 203 are not critical to the techniques described herein. Example embodiments, however, are provided for illustrative purposes. In various embodiments, the pages are presented in HTML, XML, or any other appropriate format.

Figure 2A:
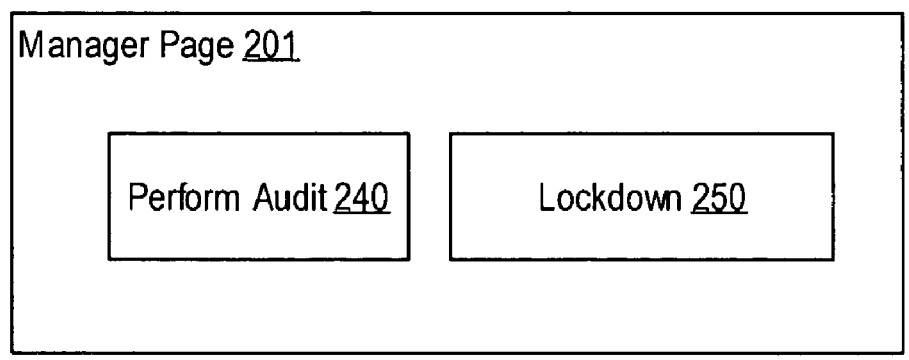
FIG. 2*a* is an illustration of a manager page.
Figure 3:
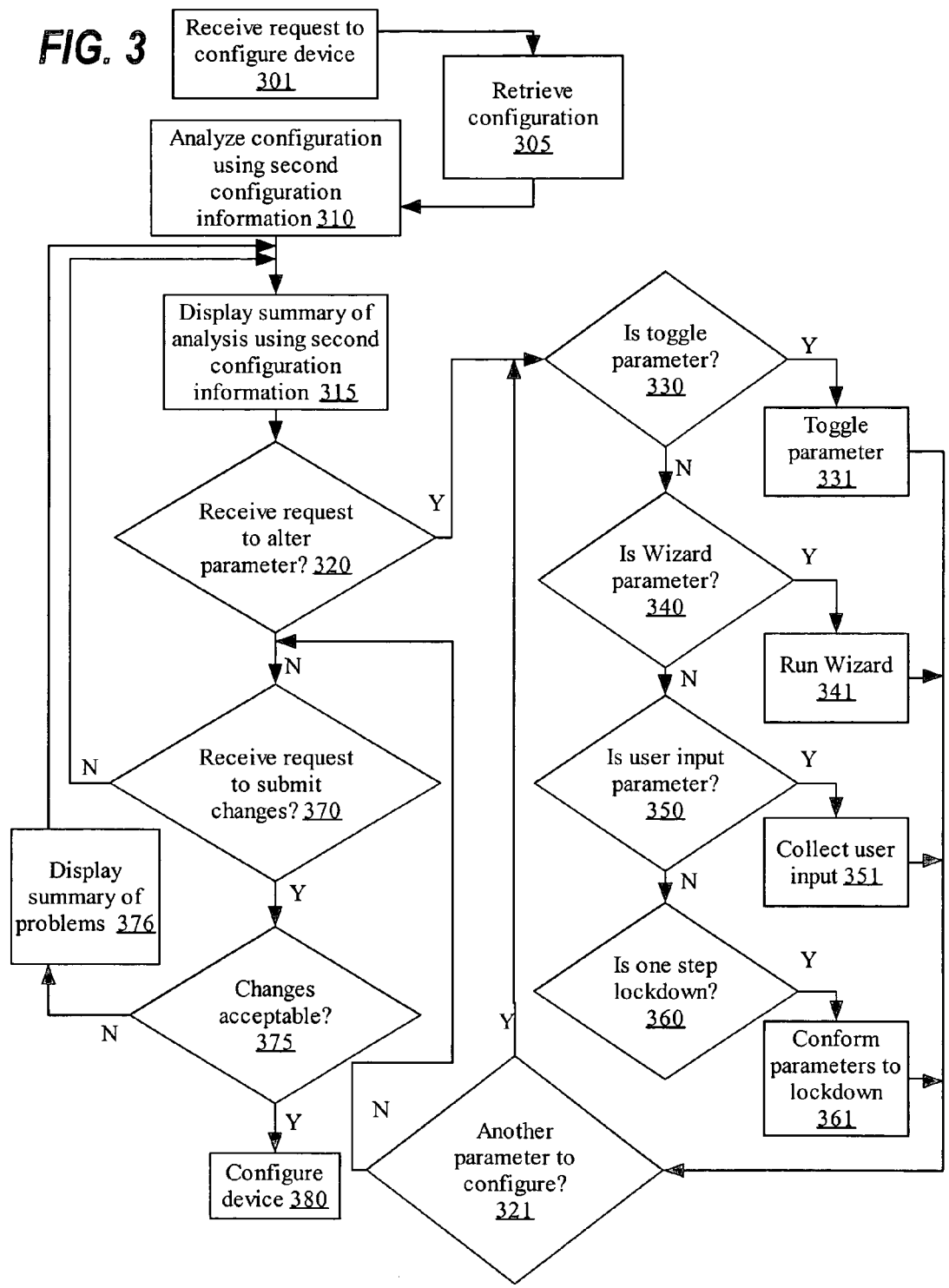
FIG. 3 depicts a flow diagram for integrated audit and configuration.

FIG. 2*a* is an illustration of a manager page 201. In various embodiments, the manager page 201 comprises a perform audit button 240 or a lock down button 250. Each button herein described is a selection mechanism. In various embodiments, each selection mechanism is a HTML button, XML button, selectable link, or other appropriate selection mechanisms. The functions of the perform audit button 240 and lockdown button 250 are discussed below in Functional Overview.

FIG. 2*b* is an illustration depicting an aspect determination page 202. In various embodiments, the aspect determination page 202 comprises an aspect description column 211, a choice column 221, a navigation row 276, or any other appropriate interface elements. In various embodiments, one or more aspects are described in the aspect description column 211. In one embodiment, the aspect description column 211 contains one or more aspect descriptions that describe various aspects of a configurable device. In one example, an aspect description column 211 includes, for a particular hypothetical configurable device 110, "interface 1", "interface 2", "interface 3", etc. In various embodiments, each listing in the aspect description column 211 includes a hyperlink associated with a help page associated with that aspect; a "drill down" link to find out more about the aspect; or any other appropriate information related to that parameter.

In various embodiments, the choice column 221 has one or more selectable choices for each of the aspects in the aspect description column 211. In various embodiments, the selectable choices are selections mechanisms as described above, are check boxes, or are any other appropriate selectable choice mechanisms. In various embodiments, the one or more choices comprise multiple choices and the choices are mutually exclusive or more than one choice can be selected for each aspect.

For example, in the context of FIG. 1, an aspect determination page 202 comprises an aspect description column 211, a choice column 221, and a navigation row 276. The aspect description column 211 contains three aspects each of which represents an interface on a configurable device 110. The choice column 221 contains two selectable alternatives that represent whether the particular aspect to which they correspond is an interface to a trusted network or an interface to an un-trusted network.

In various embodiments, pages 200, 201, 202, or 203 each contain navigation rows 276. In various embodiments, the navigation row comprises a back button 271, a next button 272, a finish button 273, a cancel button 274, or a help button 275. Each of the buttons is a selection mechanism as described above. In various embodiments, the back button 271, when selected, causes any selections made or data entered on the interface page 200, 201, 202, 203 to be ignored or for another interface page 200, 201, 202, 203 to be displayed. In various embodiments, the next button 272, causes any selections made or data entered on the interface page 200, 201, 202, 203 to be validated. In one embodiment, if the validation fails, user will be prompted to correct the entered data; if the validation is successful, then these data will be stored in a machine-readable medium communicatively coupled to the client 101 or for another interface page 200, 201, 202, 203 to be displayed. In various embodiments, the finish button 273, when selected, causes any selections made or data entered on the aspect determination page 202 or any other page 200, 201, or 203 to be stored in a machine-readable medium communicatively coupled to the client 101; for the configuration process to be completed using the information gathered; or for the configuration on the configurable device 110 to be altered based on information gathered on pages 200, 201, 202, or 203. In various embodiments, the cancel button 274 causes any selections made or data entered on the interface page 200, 201, 202, 203 to be ignored or for the configuration process to be terminated without making any changes to the configurable device. In one embodiment, the help button 275 causes a help dialog to appear. In various embodiments, the help dialog is displayed in a new window, the same window, or via any other appropriate means.

FIG. 2c is an illustration of a progress page 203. In various embodiments, the progress page 203 comprises a description column 210, a result column 223, or a close button 277. In various embodiments, the close button causes the report card page to be minimized or closed without making any changes to the configurable device. In one embodiment, the description column 210 contains one or more parameter descriptions that describe the then-current status of device parameters relating to security configuration. In the example of FIG. 2, description column 210 specifies that, for a particular hypothetical device, "Service ABC is enabled," "Banner is not set," "Set user account," etc. In various embodiments, each listing in the description column 210 contains a hyperlink associated with a help page associated with that parameter; a "drill down" link to find out more about the parameter, the current configuration, or the second set of configuration information; or any other appropriate information related to that parameter.

In one embodiment, the result column 223 contains information related to each of the listings in the description column 210. In one embodiment, if the configuration conforms to a certain set of rules, the results column contains an indication of conformity, such as the word "Passed". In one embodiment, if the configuration does not conform to a certain set of rules, the results column contains an indication of conformity, such as the phrase "Not Passed".

Figure 2D:
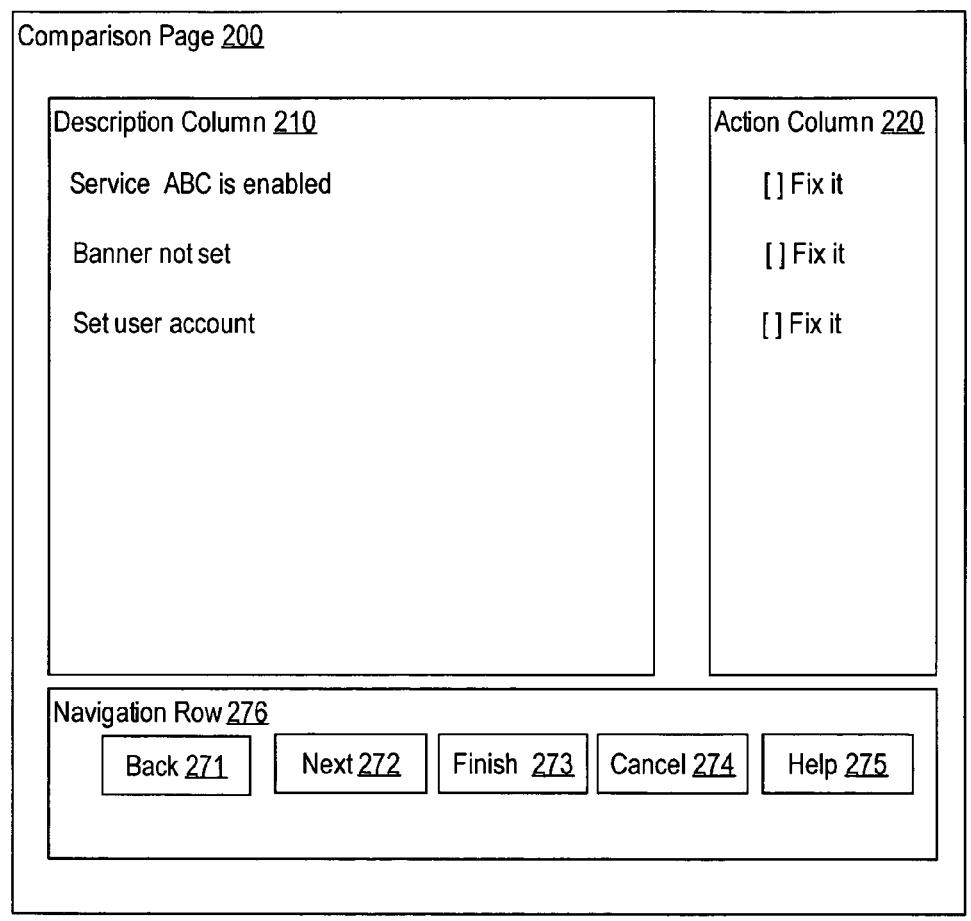
FIG. 2*d* is an illustration of a comparison page.

FIG. 2d is an illustration of a comparison page. According to one embodiment, the comparison page of FIG. 2d is generated as part of a process of integrated audit and configuration, which is described further below with reference to FIG. 3 and FIG. 5. In general, comparison page 200 displays whether the then-current configuration of a particular configurable device conforms to a second set of configuration information. In various embodiments, the second set of configuration information represents a desired configuration, target configuration, or a best practice. In various embodiments, the second set of configuration information comprises a set of rules for configurations or a set of values for parameters in the configuration. In one embodiment, the comparison page 200 is a set of one or more pages. In one embodiment of FIG. 2, comparison page 200 includes a description column 210, an action column 220, and a navigation row 230. The navigation row 276 is described above. The description column 210 is described above.

In various embodiments, the action column 220 contains actionable steps for each parameter or a subset of parameters. In a related embodiment, the action column 220 contains action mechanisms for only the parameters for which the configuration information did not conform to the second set of configuration information. In various embodiments, the action column 220 contains a user interface widget such as a hyperlink, clickable button or selectable check box to indicate that the configuration information should be updated to conform to the second set of configuration information. In one embodiment, action column 220 contains one or more selection mechanisms, such as selectable buttons or hyperlinks, which, when selected by a user, generate instructions or operations to apply configuration changes that will result in making the then-current device configuration conform to the second or target configuration information. Such operations are termed "fix it" operations.

Example Use of Techniques

An example use of the integrated audit and configuration techniques is described herein. In this example, an integrated security audit and configuration of a configurable network device is described from a user's perspective. This example in no way limits the techniques herein described, but is provided for illustrative purposes only.

First, a user launches an integrated security audit and configuration tool. The user is then provided an interface, similar to FIG. 2a. The user selects the perform audit option and is then provided with an aspect determination page similar to FIG. 2b. In this example, the aspect determination page allows the user to define which communication interfaces to the configurable network device are "internal" (ones connect to trusted, internal networks) and which ones are "external" (ones are connected to external or un-trusted networks).

Once the aspects of the communication interfaces are defined and the "Next" button is pressed, then the user sees a progress page like the one depicted in FIG. 2c. While the integrated security audit and configuration tool is processing the current device configuration with respect to the best practices configuration information, a progress bar is shown so that the user has an idea of how long the task will take.

Once the processing is completed, the progress page displays which items "passed" (where within the rules defined by the best practices configuration information) and which ones "did not pass" (where not within the rules defined by the best practices configuration information). The user then selects the "close" button to close the window.

After closing the progress page, the user is presented with a report card, like the one depicted in FIG. 2d, describing which elements of the configuration passed and did not pass with respect to the best practices configuration information. For the tasks that didn't pass, a link is provided to inform the user why the element did not pass.

For each task that didn't pass the test, the user will have an option of instructing the tool to "fix it" for them. This is accomplished by checking the "fix it" box on the interface. If a fix requires the user to input data (e.g. username and password), the security audit and configuration tool will provide an interface page that asks user to enter data for that specific fix. If a fix requires no user input, the security audit and configuration tool makes any necessary changes without user input.

Validation for data entered and decisions made by the user are validated when the user hits the "Next" button. After hitting the Next button, the user is provided with a human-readable task completion summary window. If the user likes the changes that have been made, the user can press the "Finish" button and the new configuration will be delivered to the device.

The example described herein has many advantages for the user. First of all, it allows the user to play what-if scenarios with their configuration and compare those scenarios against a best practices configuration rule set. It also enables a user to configure a device, based on a set of configuration rules and information without needing configuration expertise. The integrated audit and configuration techniques provide an automated process that increases users' productivity and reduces errors. It makes device audit and configuration an easy task to achieve.

Functional Overview

The following functional description requires no particular hardware, operating system, software system, or other detail for an implementation. Additionally, the flow diagrams presented are examples of possible algorithmic flow and in no way limit the scope of the invention. Embodiments of the invention can be practiced in many ways in many disparate hardware and software environments and using different algorithmic flow.

Single Device Audit and Configuration

FIG. 3 depicts a flow diagram for a process of integrated audit and configuration.

First, a request is received to configure a particular device, step 301. In various embodiments, the request is received by the particular device or is received by a process thereto communicatively coupled. In various embodiments, the request to configure the particular device is received via a network, FTP, HTTP, HTTPS, TCP/IP sockets, or other appropriate data transport mechanisms. In various embodiments, the request is in HTML, XML, or any other appropriate format. For example, in the context of FIG. 1, a human user submits a HTML request to configure a particular device via a client 101 to a configurable device 110 via HTTP. Step 301 also may involve executing an integrated audit and configuration process implemented in one or more software elements that execute at client 101.

After the request is received in step 301, the then-current configuration of the particular device is retrieved (step 305). In various embodiments, the configuration information is retrieved by the particular device or is received by a process communicatively coupled thereto. In various embodiments, the configuration information includes one or more configuration files, one or more sets of device interface settings stored in memory, or any other appropriate configuration information. For example, in the context of FIG. 1, the configurable device 110 retrieves its configuration by parsing a configuration file and storing the content of the configuration file into a data structure in a memory communicatively coupled to the device.

In step 310, the configuration information for the particular device is analyzed using a second set of configuration information. In various embodiments, the second set of configuration information is a set of rules defining ranges for parameters, rules relating multiple parameters, or any other appropriate rules. In one embodiment, the configuration information includes settings for each of multiple parameters. In various embodiments, analyzing the configuration information comprises comparing the configuration information to the second set of configuration information includes comparing the value for every parameter or comprises comparing a subset of all of the parameter values. In one embodiment, the second set of configuration information represents an industry standard configuration. Alternatively, the second set of configuration information represents a standard configuration of an enterprise or a department.

In various embodiments, there are multiple sets of configuration information and the choice of which set of configuration information to use as the second set of configuration information is made based on the type of device the particular device is, a request for a particular configuration from the party sending the request, or any other appropriate criteria for choosing which set of configuration information to use in the comparison. In one embodiment, the second set of configuration information is sent in the request in step 301. In another embodiment, the second set of configuration information is stored in a memory accessible to the particular device. For example, in the context of FIG. 1, a process communicatively coupled to the configurable device 110, e.g. the client 101, analyzes each the parameters in the configuration to using the rules in the second set of configuration information, where that second set of configuration information is stored in a memory communicatively coupled to the configurable device 110.

In the example used herein, the memory communicatively coupled to the configurable device 110 is also communicatively coupled to the client 101 and the client 101 is performing the steps herein described. The location of where the steps are performed and where the location of the memory storing the configuration do not limit the techniques herein described and are illustrative only.

In step 315, a summary of the analysis performed in step 310 is displayed. In various embodiments, displaying the analysis comprises generating a page in HTML, XML, or any appropriate format. An embodiment of an example comparison page is shown in FIG. 2 and described above in the section entitled "Comparison Page." The comparison page displayed in step 315 will give the user the opportunity to perform actions based on the analysis, including the actions discussed below.

If a request to alter a parameter is received in step 320, then the type of request is checked in steps 330, 340, 350, and 360. For example, in the context of FIG. 1 and FIG. 2, a comparison page 200 is displayed to a user communicatively coupled to a client 101, and the comparison page 200 contains a description column 210 and action column 220, and the comparison page 200 contains a comparison of each parameter in the configuration.

If it is determined in step 330 that a request has been received to alter a toggle parameter, then the toggle parameter is altered in step 331. In various embodiments, a request to alter a toggle parameter is associated with a "fix it" button on the comparison page, a "toggle it" button, or any other appropriate action mechanism. In a related embodiment, the "fix it" button appears when the value for the toggle parameter in the configuration information differs from the value for the parameter in the second set of configuration information. In a related embodiment, the action associated with the "fix it" button or checkbox comprises changing the value associated with the parameter based on the value or rule for the parameter in the second set of configuration information. In another related embodiment, a request to alter a toggle parameter is associated with a "toggle" button on the comparison page. In the embodiment, the action associated with the "toggle it" button or checkbox is to change the value associated with the parameter. For example, in the context of FIG. 1 and FIG. 2, the comparison page 200 displayed to the user contains a toggle action mechanism in the action column 220, and the user selects the toggle action mechanism. Then, the toggle parameter is changes appropriately in the configuration in the memory communicatively coupled to the client 101.

In various embodiments, a toggle parameter can have two or more values and the toggle of fix action mechanisms will alter the value for the parameter so that it is equivalent to the corresponding value in the second set of configuration information.

If the parameter to be changed is a wizard parameter (step 340), then a wizard associated with the parameter is executed (step 341). In various embodiments, the wizard is a series of web pages, windows of a GUI, or other displayed steps that walk a user through the series of steps for completing a process. In various embodiments, the wizard configures one parameter or multiple parameters. In one embodiment, the wizard collects data from a user via a client device. In various embodiments, the wizard is run on the client device or a process communicatively coupled thereto. In one embodiment, a separate application is activated in order to run the wizard. For example, in the context of FIGS. 1 and 2, the comparison page 200 displayed to the user contains a wizard action mechanism in the action column 220, and the user selects the wizard action mechanism. Then, the wizard is initiated on the client 101 and the user inputs data appropriately in the wizard and the client 101 appropriately changes the configuration in the memory communicatively coupled to the client 101.

If the parameter to be changed is a user input parameter (step 350), then user input is collected (step 351). In various embodiments, user input is collected by providing an input mechanism, such as a text box, check box, or set of radio buttons, or a button in the same window or in a new window. In one embodiment, the data is collected from a user via a client device. For example, in the context of FIG. 1 and FIG. 2, the comparison page 200 displayed to the user contains a user input action mechanism in the action column 220, and the user selects the user input action mechanism. User input is collected on the client 101 and the user inputs data appropriately. The client 101 appropriately changes the configuration in the memory communicatively coupled to the client 101.

If the request to alter the data is a lockdown action mechanism (step 360), then the lockdown procedure is performed (step 361). In one embodiment, the lockdown procedure comprises setting one or more parameters in the configuration information to match the corresponding one or more parameters from the second set of configuration information or to conform to rules in the second set of configuration information. In various embodiments, the lockdown procedure sets all of the toggle parameters; parameters requiring user input; wizard parameters; or any combination of these. In related embodiments, the lockdown sets one or more toggle parameters without user input; one or more user input parameters by collecting input form a user; or one or more wizard parameters by running each associated wizard. Thus, in one embodiment the lockdown is a one-step lockdown and, from the perspective of the user, the system causes a device to confirm to the second set of configuration in one processing step, without user review or intervention.

For example, in the context of FIG. 1 and FIG. 2, comparison page 200 displays a lockdown action mechanism 250 in the navigation row 230, and the user selects the lockdown action mechanism 250. Then, the client 101 sets all toggle parameters, and a subset of the user input parameters (e.g., those for which the data from the second set of configuration information can be used) are changed in the configuration to match the corresponding parameters in the second set of configuration information. Then the client 101 appropriately changes the configuration in the memory communicatively coupled to the client 101.

In one embodiment, after each of the steps 331, 341, 351, and 361, a check is performed to determine whether a there is another parameter to configure in step 321. If there is another parameter to configure, then a check is made to determine what type of parameter it is (steps 330, 340, 350, or 260). If there is no other parameter to configure, then a check is made to determine whether a request to submit changes was received in step 370.

In another embodiment, after each of the steps 331, 341, 351, and 361, a summary of the analysis of the configuration information using the second configuration information is displayed. In various embodiments, a new the analysis of the configuration information using the second set of configuration information is performed (step 310); the analysis is updated to reflect the most recent alteration and then displayed (step 315); or the previously displayed analysis continues to be shown (step 315). For example, in the context of FIG. 1 and FIG. 2, a new analysis of the new configuration information using the second set of configuration is performed, thereby reflecting the changes made in steps 331, 341, 351, and 361. This is displayed a new comparison page 200 to a user communicatively coupled to a client 101.

In various embodiments, the steps that determine what type of parameter is being configured (steps 330, 340, 350, 360) are performed in any appropriate order, in parallel, or all or only a subset of the steps is performed.

If a request to submit the changes is received (step 370), then a check is made to determine whether the requested changes are acceptable (step 375). In one embodiment, a user clicks a button in order to request to submit the changes. In one embodiment, the changes made in steps 331, 341, 351, and 361 are checked with an acceptability mechanism in order to determine if the aggregation of the changes are acceptable. In a related embodiment, an acceptability mechanism is an application or subroutine that has defined within it an object model of the constraints of each parameter, the device as a whole, and the interrelation of the parameters. In a related embodiment, the device or a process thereto communicatively coupled creates a model in memory of a new configuration that reflects the changes and checks acceptability of the new configuration with the acceptability mechanism. For example, in the context of FIGS. 1, 2a, 2b, 2c, and 2d, a user communicatively coupled to a client 101 clicks a finish button 273 in the navigation row 276 of a comparison page 200. Then the new configuration (reflecting the changes made in steps 331, 341, 351, and 361) is checked by an acceptability mechanism in step 375.

If the changes are not acceptable (from step 375), then a summary of the problems is displayed (step 376). In various embodiments, displaying a summary of the problems comprises displaying a human-readable description of each problem or a summary of the analysis of the new configuration using the second set of configuration information with each problem highlighted by color, font, or any other appropriate mechanism. In one embodiment, the summary of problems is displayed as part of the analysis of step 315. In various embodiments, after or as part of displaying the summary of problems, an analysis of the configuration information using the second set of configuration information is displayed (step 315). For example, in the context of FIGS. 1, 2a, 2b, 2c, and 2d, a summary of the problems with the proposed changes is displayed to a user communicatively coupled to a client 101 via the comparison page 200 by highlighting in red font all parameters which have problems.

If the changes are acceptable (step 375), then the device is configured (step 380). In various embodiments, the changes are acceptable if there are not problems determined in step 375 or if there are problems detected in step 375, but a user has indicated that the user feels that the changes are acceptable. In a related embodiment, the user indicates that the changes are acceptable by clicking a button, checking a checkbox, or any other appropriate method. For example, in the context of FIG. 1 and FIG. 2, the user, via a client 101, views the problems with the new configuration of the configurable device 110 and clicks a "Configure device with these changes anyway" button. In another example, in the context of FIGS. 1, 2a, 2b, 2c, and 2d, there are no problems with the configuration of the configurable device 110 and the changes are accepted without further user input.

In various embodiments, configuring the device includes generating a new configuration file for the configurable device, sending the new configuration file to a configurable device via a network, HTTP, FTP, TCP/IP, or any appropriate communication mechanism, or altering the configuration of the configurable device via an application program interface, or any appropriate means for altering the configuration. For example, in the context of FIGS. 1, 2a, 2b, 2c, and 2d, the client 101 alters the configuration of device 110 by uploading a new configuration file to the device.

Various embodiments of FIG. 1, FIG. 2, and FIG. 3 enable efficient configuration of devices while limiting expertise needed in the processing of the configuration of the device; enabling analysis of the configuration information using a second set of configuration information, such as an industry standard; providing an overview of the configuration; and avoiding the need to cut and paste configuration information.

Whereas FIG. 3 depicts a certain flow of events, the invention is not limited to these steps or this flow. Additional steps could be performed, steps could be left out, and the steps could be performed in parallel or in a different order.

Configurable System Audit and Configuration

Figure 4:
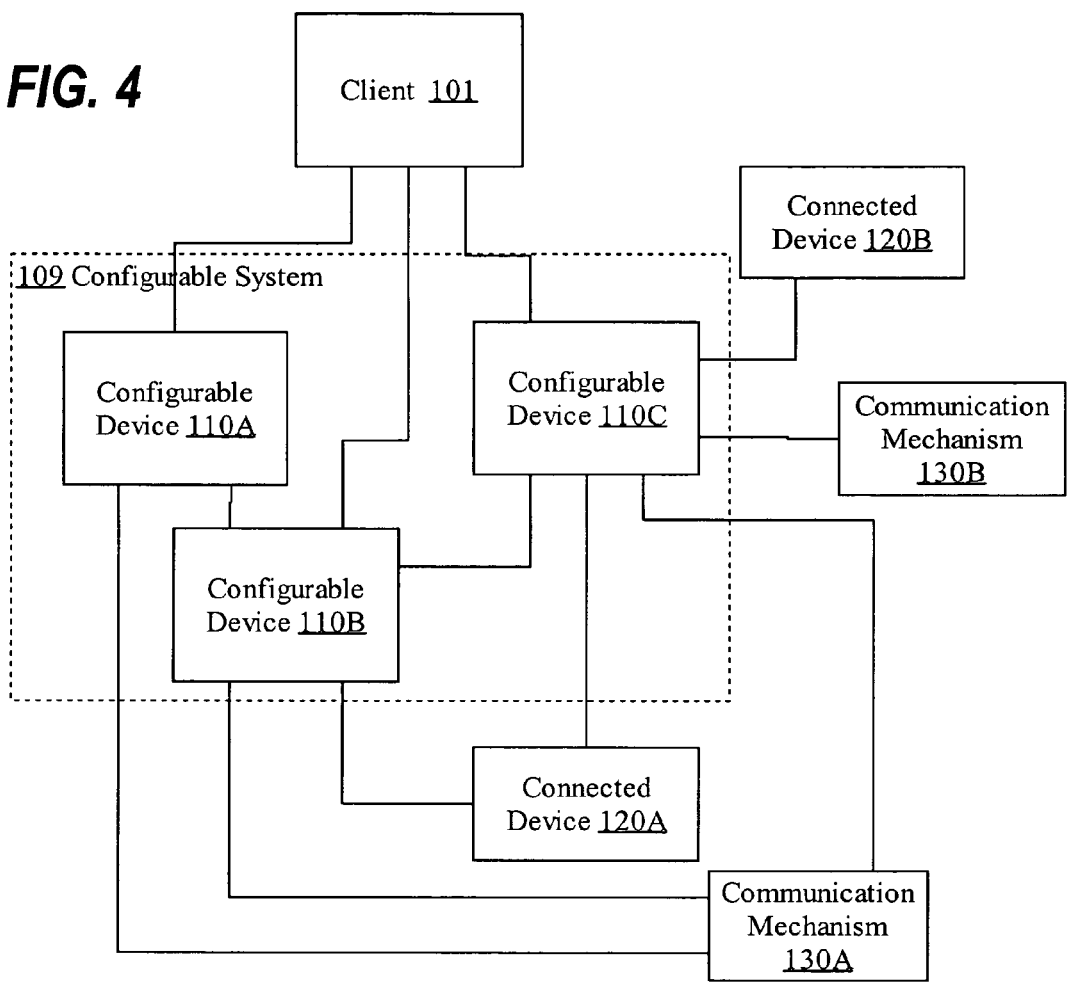
FIG. 4 is a block diagram depicting a system for configuring a configurable system.

FIG. 4 is a block diagram depicting a system for configuring a configurable system.

In the example system of FIG. 4, multiple configurable devices 110A, 110B, 110C are communicatively coupled to a client 101. Each of the multiple configurable devices 110A, 110B, 110C are part of a configurable system 109. Example configurable devices 110 are described above in System Overview. In one embodiment, a configurable system is a logical aggregation of multiple configurable devices. In another embodiment, the configurable system is a set of multiple configurable devices on a particular LAN, network, network device group, or other grouping of devices.

Configurable device 110B is communicatively coupled to configurable devices 110A and 110C. Configurable devices 110A, 110B, 110C are each communicatively coupled to a communication mechanism 130A. The configurable device 110C is also communicatively coupled to a communication mechanism 130B. The connected device 120A is communicatively coupled to configurable devices 110B and 110C. The connected device 120B is communicatively coupled to configurable device 110C. Example configurable devices, clients, connected devices, and communication mechanisms are described above in System Overview.

FIG. 5 is a flow diagram of a technique for configuring a configurable system.

In step 510, a request is received to configure a configurable system, that system consisting of multiple configurable devices. In various embodiments, the request is received by a particular configurable device in the configurable system or is received by a process communicatively coupled to one of the configurable devices in the configurable system. In one embodiment, the request to configure the system is received by each of the configurable devices in the configurable system. In various embodiments, the request to configure the particular device is received via a network, FTP, HTTP, HTTPS, TCP/IP sockets, or other appropriate data transport mechanisms. In various embodiments, the request is in HTML, XML, or any other appropriate format. For example, in the context of FIG. 4, a human user submits a HTML request via HTTP to configure a configurable system, where the user submits the request via a client 101 and the request is received at a configurable device 110A.

Once the request is received in step 510, individual configurable devices are configured (step 520). An example process for configuring an individual configurable device is described in Single Device Audit and Configuration. In various embodiments, every configurable device is configured, a subset of the configurable devices is configured, or none of the configurable devices are configured. For example, in the context of FIG. 4, a user configures the configurable device 110A using the techniques discussed in Single Device Audit and Configuration.

After configuring individual devices (step 520), the configuration of the configurable systems is determined (step 530). In various embodiments, determining the configuration of the configurable system comprises analyzing the configurations of the configurable devices or generating configuration information based on the configuration information for each individual device. In a related embodiment, after collecting configuration information for two or more configurable devices, the client or a process thereto communicatively coupled generates aggregate configuration information for the two or more configurable devices. For example, in the context of FIG. 4, determining the configuration of configurable system 109 comprises, at least in part, determining which configurable devices 110A, 110B, 110C are connected to which other configurable devices 110A, 110B, 110C.

In various embodiments, the configurations of the configurable devices and of the configurable system are stored in an object model or data structure in a memory or a machine-readable medium communicatively coupled to the client or a process thereto communicatively coupled. For example, in the context of FIG. 4, the configuration information for the configurable devices 110A, 110B, 110C and configurable system 109 are stored in a data structure in a memory communicatively coupled to client 101.

In the example herein, the client 101 determines the configuration of the configurable system and performs the techniques described herein. It does not matter, however, what application or process performs the steps. It could be any one of the configurable devices 110A, 110B, or 110C, or any other process or application.

After determining the configuration of the configurable system (step 530), the configuration is displayed in step 535. In various embodiments, displaying the comparison comprises generating a page in HTML, XML, or any appropriate format. Various embodiments of exemplary comparison pages are described above in Comparison Page. The comparisons page displayed in step 535 will give the user the opportunity to perform actions based on the comparison. For example, in the context of FIG. 2 and FIG. 4, a comparison page 200 is displayed to a user communicatively coupled to a client 101, and the comparison page 200 contains a description column 210 and action column 220 and the comparison page 200 contains a comparison to a second set of configuration information to the configuration of the configurable devices 110A, 110B, 110C and the configurable system 109

The configurable system can be altered in step 540. In various embodiments, altering the configuration in step 540 comprises receiving a request to alter the configuration of the configurable system or one of the configurable devices. In various embodiments, configuring the configurable system includes altering the configuration of one or more configurable devices, the interconnection of one or more configurable devices, or the interfaces of the one or more configurable devices and connected devices or communication mechanisms. For example, in the context of FIG. 4, the object model or data structure in a memory communicatively coupled to the client 101 is altered by the client 101 to reflect changes to the configuration of configurable device 110A and the interconnection between configurable devices 110A and 110B.

If the configuration of the configurable system is not altered in step 540, then the technique ends and no further configuration of the configurable system is performed (step 570). For example, in the context of FIG. 2 and FIG. 4, there is a cancel button in the navigation row 230 of the comparison page 200. A user clicks the cancel button and the configuration of the configurable system 109 is terminated.

If the configuration is altered in step 540, then the new configuration is checked for acceptability in step 550. In one embodiment, the changes made in step 540 are checked with an acceptability mechanism in order to determine if the aggregation of the changes are acceptable. In a related embodiment, the acceptability mechanism is an application or subroutine that has defined within it an object model of the constraints of each parameter, the device as a whole, and the interrelation among parameters. In a related embodiment, the device or a process thereto communicatively coupled creates a model in memory of a new configuration that reflects the changes and checks acceptability of the new configuration using the acceptability mechanism. For example, in the context of FIG. 4, a client 101 checks the acceptability of the configuration changes made in step 540 by generating a new object model of the configuration based on the changes and analyzing the new object model using an object model of constraints.

In various embodiments, the acceptability of a configuration is determined by analyzing the configuration using the configuration to a second set of configuration information. This is described in detail in Single Device Audit and Configuration.

If the changes are not acceptable (checked in step 550), then a summary of the problems is displayed (step 555). In various embodiments, displaying a summary of the problems comprises displaying a human-readable description of each problem or a summary of the analysis of the configuration information using the second set of configuration information with each problem highlighted by color, font, or any other appropriate mechanism. In one embodiment, the summary of problems is displayed as part of step 535. In various embodiments, after, or as part of, displaying the summary of problems, the analysis of the configuration information using the second set of configuration information is displayed (step 555). For example, in the context of FIG. 4, a summary of the problems with the proposed changes are displayed to a user communicatively coupled to a client 101 by highlighting in red font all parameters which have problems.

If the changes are acceptable (step 550), then the configuration is altered (step 560). In various embodiments, the changes are acceptable if there are not problems determined in step 550 or if there are problems detected in step 550, but a user has indicated that the user feels that the changes are acceptable. In a related embodiment, the user indicates that the changes are acceptable by clicking a button, checking a checkbox, or any other appropriate method. For example, in the context of FIG. 4, the user, via a client 101, views the problems with the new configuration of the configurable system 109 and clicks a "Configure device with these changes anyway" button. In another example, in the context of FIG. 4, there are no problems with the configuration of the configurable system 109 and the changes are accepted without further user input.

In various embodiments, altering the configuration includes generating a new configuration file for a configurable device; sending a configuration file to a configurable device via a network, HTTP, FTP, TCP/IP, or any appropriate communication mechanism; or altering a configuration via an application program interface; or any appropriate means for altering the configuration. For example, in the context of FIG. 4, the client 101 alters the configuration of devices 110A, 110B, and 110C by uploading new configuration files to each device.

Various embodiments of FIGS. 4 and 5 enable efficient configuration of configurable systems while reducing the expertise needed in the processing of the configuration of the configurable system and configurable devices in the configurable system; enabling analysis of the configuration using another set of configuration information; providing an overview of the configuration; and avoiding the need to cut and paste configuration information.

Whereas FIG. 5 depicts a certain flow of events, the invention is not limited to these steps or this flow. Additional steps could be performed, steps could be left out, and the steps could be performed in parallel or in a different order.

Hardware Overview

Figure 6:
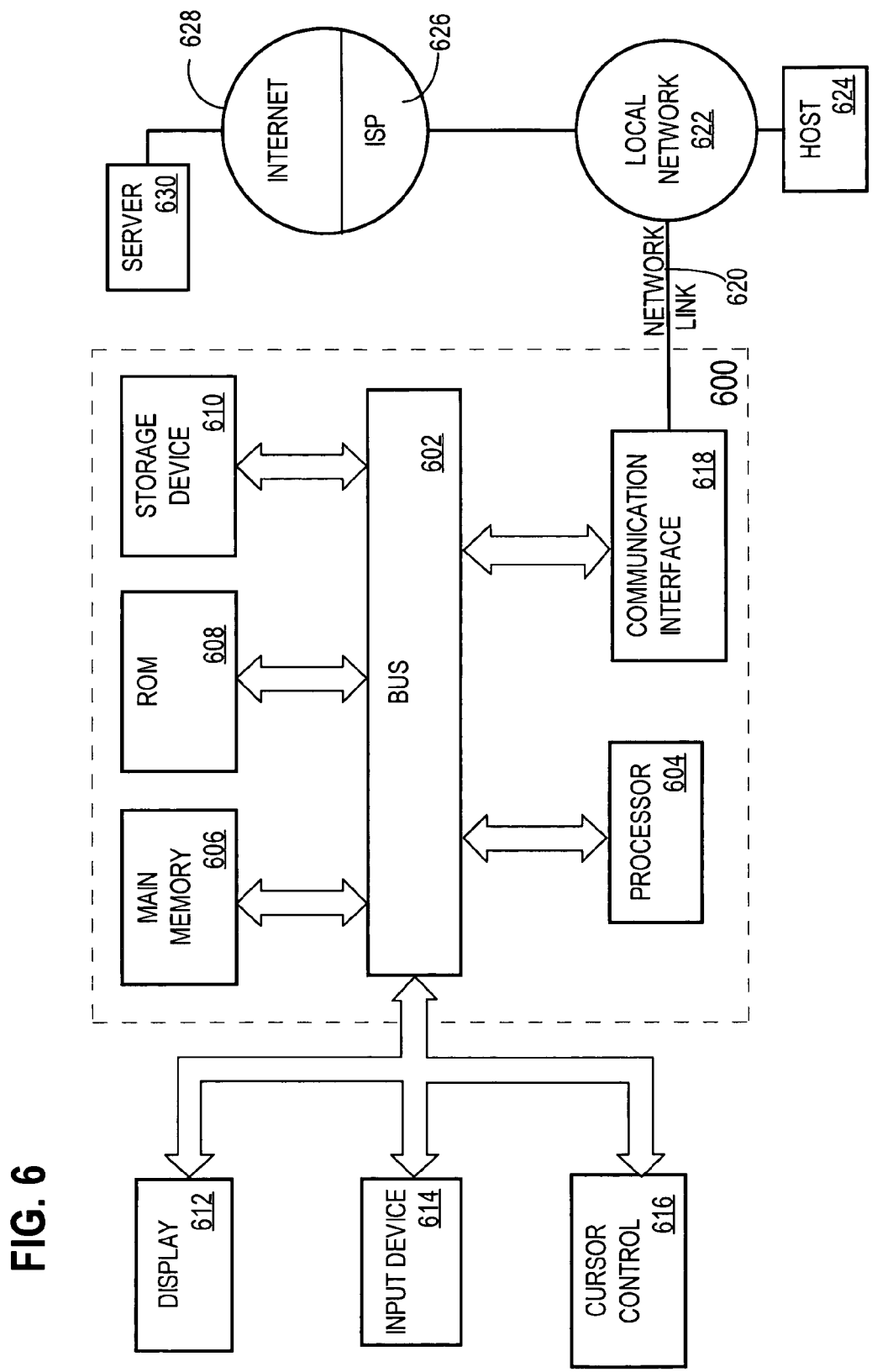
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for integrated audit and configuration comprising the computer-implemented steps of:

receiving a request from a user to analyze first configuration information with a second set of configuration information;

receiving the first configuration information;

analyzing one or more parameters of the first configuration information with the second set of configuration information to result in creating and storing comparison information;

displaying the comparison information including displaying parameters of the first configuration that do not conform with the parameters of the second configuration;

choosing one or more action mechanisms to display to the user for each of the one or more parameters based on the comparison information including the non-conforming parameters;

enabling the user to select a displayed action mechanism to perform one or more actions associated with the one or more action mechanisms;

based on the user's selection, generating instructions and applying changes to the first configuration information;

wherein the one or more action mechanisms comprise at least one from a group consisting of toggle actions, wizard actions, and lockdown actions; wherein each of the one or more action mechanisms has separate properties and characteristics and performs separate changes to the first configuration file;

receiving a second request from the user to perform one action of the one or more actions;

performing the one action;

wherein the second request is one of one or more requests to perform one or more corresponding actions;

performing the one or more corresponding actions based on the one or more requests to perform actions by constructing a new configuration information based on the first configuration information and each of the one or more corresponding actions;

checking the new configuration against an object model of acceptable configurations, wherein the object model comprises constraints for each parameter in the configuration, interrelations among those parameters, and how those parameters relate as a whole to the device being configured;

if the changes are not acceptable, displaying a summary of problems.

2. The method of claim 1, wherein the second set of configuration information comprises a set of one or more parameter values; and wherein the step of analyzing one or more parameters of the first configuration information comprises comparing a values of each of the one or more parameters in the first configuration information with a corresponding parameter values from the set of one or more parameter values from the second set of configuration information.

3. The method of claim 1, wherein the second set of configuration information comprises a set of one or more rules; and wherein the step of analyzing one or more parameters of the first configuration information comprises analyzing the one or more parameters of the first configuration information with respect to the set of one or more rules.

4. The method of claim 1, where the new configuration is the configuration for a configurable system; wherein the configurable system includes one or more configurable devices; and wherein the method further comprises the steps of:

receiving a third request to submit the changes;

checking the new configuration information against an object model of acceptable configurations; and if the changes are acceptable, configuring the configurable system.

5. The method of claim 1, wherein the first configuration information comprises the configuration for a configurable system; wherein the configurable system includes one or more configurable devices; and wherein the first configuration information is for each of the one or more configurable devices; and wherein the step of receiving the first configuration information comprises obtaining the first configuration information for each of the one or more configurable devices.

6. The method of claim 1, wherein the second set of configuration information is one of one or more sets of second configuration information; and wherein the method further comprises selecting the second set of configuration information based on the request from the user.

7. The method of claim 1, wherein the second set of configuration information is one er of one or more sets of second configuration information; and wherein the method further comprises selecting the second set of configuration information based on one or more sets of configuration information for a device to be configured.

8. The method of claim 1, wherein the one or more actions comprise one or more toggle actions, and the one or more action mechanisms comprise one or more toggle action mechanisms, and wherein the step of performing the action associated with a particular toggle action mechanism comprises changing a parameter value associated with the particular toggle action mechanism.

9. The method of claim 1, wherein the one or more actions comprise one or more fix actions, and the one or more action mechanisms comprise one or more fix action mechanisms, and wherein the step of performing the action associated with the fix action mechanism comprises changing a parameter value associated with a particular fix action mechanism based on a corresponding parameter value in the second set of configuration information.

10. The method of claim 1, wherein the one or more actions comprise one or more user input actions, and the one or more action mechanisms comprise one or more user input action mechanisms, and wherein the step of performing the action associated with a particular user input action mechanism comprises:

obtaining user input for a parameter value associated with the particular user input action mechanism; and changing the parameter value associated with the particular user input action mechanism based on the user input.

11. The method of claim 1, wherein the one or more actions comprise one or more wizard actions, and the one or more action mechanisms comprise one or more wizard action mechanisms, and wherein the step of performing the action associated with a particular wizard action mechanism comprises the step of running a wizard associated with the particular wizard action mechanism.

12. A computer-readable storage medium storing one or more sequences of instructions that, when executed by one or more processors, cause the processors to perform:

receiving a request from a user to analyze first configuration information with a second set of configuration information;

receiving the first configuration information;

analyzing one or more parameters of the first configuration information with the second set of configuration information to result in creating and storing comparison information;

displaying the comparison information including displaying parameters of the first configuration that do not conform with the parameters of the second configuration;

choosing one or more action mechanisms to display to the user for each of the one or more parameters based on the comparison information including the non-conforming parameters;

enabling the user to select a displayed action mechanism to perform one or more actions associated with the one or more action mechanisms;

based on the user's selection, generating instructions and applying changes to the first configuration information;

wherein the one or more action mechanisms comprise at least one from a group consisting of toggle actions, wizard actions, and lockdown actions; wherein each of the one or more action mechanisms has separate properties and characteristics and performs separate changes to the first configuration file;

receiving a second request from the user to perform one action of the one or more actions;

performing the one action;

wherein the second request is one of one or more requests to perform one or more corresponding actions;

performing the one or more corresponding actions based on the one or more requests to perform actions by constructing a new configuration information based on the first configuration information and each of the one or more corresponding actions;

checking the new configuration against an object model of acceptable configurations, wherein the object model comprises constraints for each parameter in the configuration, interrelations among those parameters, and how those parameters relate as a whole to the device being configured;

if the changes are not acceptable, displaying a summary of problems.

13. The computer-readable storage medium of claim 12, wherein the second set of configuration information comprises a set of one or more parameter values; and wherein the instructions that cause analyzing one or more parameters of the first configuration information comprise instructions that cause comparing a value of each of the one or more parameters in the first configuration information with a corresponding parameter value from the set of one or more parameter values from the second set of configuration information.

14. The computer-readable storage medium of claim 12, wherein the second set of configuration information comprises a set of one or more rules; wherein the instructions that cause analyzing one or more parameters of the first configuration information comprise instructions that cause analyzing the one or more parameters of the first configuration information with respect to the set of one or more rules.

15. The computer-readable storage medium of claim 12, wherein the new configuration is the configuration for a configurable system; wherein the configurable system includes one or more configurable devices; further comprising one or more sequences of instructions that cause the processors to receive a third request to submit the changes;

check the new configuration information against an object model of acceptable configurations;

if the changes are acceptable, configure the configurable system.

16. The computer-readable storage medium of claim 12, wherein the first configuration information comprises the configuration for a configurable system; wherein the configurable system includes one or more configurable devices; wherein the first configuration information is for each of the one or more configurable devices; wherein the instructions which cause receiving the first configuration information comprise instructions that cause obtaining the first configuration information for each of the one or more configurable devices.

17. The computer-readable storage medium of claim 12, wherein the second set of configuration information is one of one or more sets of second configuration information; further comprising one or more sequences of instructions that cause the processors to select the second set of configuration information based on the request from the user.

18. The computer-readable storage medium of claim 12, wherein the second set of configuration information is one of one or more sets of second configuration information; further comprising one or more sequences of instructions that cause the processors to select the second set of configuration information based on one or more sets of configuration information for a device to be configured.

19. The computer-readable storage medium of claim 12, wherein the one or more actions comprise one or more toggle actions; wherein the one or more action mechanisms comprise one or more toggle action mechanisms; wherein the instructions that cause performing the action associated with a particular toggle action mechanism comprise instructions that cause changing a parameter value associated with the particular toggle action mechanism.

20. The computer-readable storage medium of claim 12, wherein the one or more actions comprise one or more fix actions; wherein the one or more action mechanisms comprise one or more fix action mechanisms; wherein the instructions that cause performing the action associated with the fix action mechanism comprise instructions that cause changing a parameter value associated with a particular fix action mechanism based on a corresponding parameter value in the second set of configuration information.

21. The computer-readable storage medium of claim 12, wherein the one or more actions comprise one or more user input actions; wherein the one or more action mechanisms comprise one or more user input action mechanisms; wherein the instructions that cause performing the action associated with a particular user input action mechanism comprise instructions which when executed cause obtaining user input for a parameter value associated with the particular user input action mechanism;

changing the parameter value associated with the particular user input action mechanism based on the user input.

22. The computer-readable storage medium of claim 12, wherein the one or more actions comprise one or more wizard actions; wherein the one or more action mechanisms comprise one or more wizard action mechanisms; wherein the instructions that cause performing the action associated with a particular wizard action mechanism comprise instructions that cause running a wizard associated with the particular wizard action mechanism.

* * * * *